United States Patent
Lee

(10) Patent No.: US 10,005,351 B1
(45) Date of Patent: Jun. 26, 2018

(54) HYBRID POWERTRAIN FOR VEHICLE

(71) Applicant: Hyundai Motor Company, Seoul (KR)

(72) Inventor: Kyung Shin Lee, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days. days.

(21) Appl. No.: 15/480,018

(22) Filed: Apr. 5, 2017

(30) Foreign Application Priority Data

Dec. 1, 2016 (KR) .................. 10-2016-0162537

(51) Int. Cl.
*B60K 6/445* (2007.10)
*B60K 6/365* (2007.10)
*F16H 3/72* (2006.01)

(52) U.S. Cl.
CPC .......... *B60K 6/445* (2013.01); *B60K 6/365* (2013.01); *F16H 3/728* (2013.01); *B60Y 2200/92* (2013.01); *F16H 2200/2005* (2013.01); *Y10S 903/91* (2013.01)

(58) Field of Classification Search
CPC .. F16H 3/727; F16H 3/728; F16H 2200/2005; F16H 2200/2007; B60K 6/445; B60K 6/365

USPC ......................................................... 475/338
See application file for complete search history.

(56) References Cited

U.S. PATENT DOCUMENTS 8,734,281 B2 * 5/2014 Ai .......................... B60K 6/365
180/65.21

FOREIGN PATENT DOCUMENTS

| JP | 4930267 B2 | 5/2012 |
| JP | 2012-236579 A | 12/2012 |
| KR | 10-1500120 B1 | 3/2015 |
| KR | 10-2015-0070488 A | 6/2015 |

* cited by examiner

*Primary Examiner* — Erin D Bishop
(74) *Attorney, Agent, or Firm* — Brinks Gilson & Lione

(57) ABSTRACT

A hybrid powertrain for a vehicle includes: a planetary gear system including coaxial double pinions each having a first pinion and a second pinion that have different diameters and are provided to rotate coaxially; a carrier carrying the coaxial double pinions; and four rotation elements through which power is input and output. The hybrid powertrain further includes an engine, a first motor generator, a second motor generator, and an output shaft that are respectively connected to the four rotation elements of the planetary gear system.

7 Claims, 22 Drawing Sheets

FIG. 4

| Vehicle condition | Mode | | Components operation state | | | | | | |
|---|---|---|---|---|---|---|---|---|---|
| | | | Engine | MG1 | MG2 | BK1 | BK2 | CL | OWC |
| Stop | Engine start | MG1 start | OFF→ON | Start | OFF | OFF | OFF | OFF | OFF |
| | | MG2 start | OFF→ON | OFF | Start | OFF | OFF | OFF | OFF |
| | | Cold-start (MG1+MG2) | OFF→ON | Start | Start | OFF | OFF | OFF | OFF |
| | Charge | MG1 generation | ON | Generate electricity | OFF | OFF | OFF | OFF | OFF |
| | | MG2 generation | ON | OFF | Generate electricity | OFF | OFF | OFF | OFF |
| | | Rapid charge (MG1+MG2) | ON | Generate electricity | Generate electricity | OFF | OFF | OFF | OFF |
| Drive | Ev drive | MG1 drive | OFF | Drive | OFF | OFF | OFF | OFF | ON |
| | | MG2 drive | OFF | OFF | Drive | OFF | OFF | OFF | ON |
| | | High output (2 motors) | OFF | Drive | Drive | OFF | OFF | OFF | ON |
| | HEV drive (Engine + Motor) | EVT | ON | Drive/Generate | Drive/Generate | OFF | OFF | OFF | OFF |
| | | Fixed stage 1 (1:1) | ON | Drive/Generate | Drive/Generate | OFF | OFF | ON | OFF |
| | | Fixed stage 2 (OverDrive) | ON | OFF | Drive/Generate | OFF | ON | OFF | OFF |
| | Mode conversion (EV → HEV) | | OFF→ON | Start | Drive | OFF | OFF | OFF | OFF |
| | Creep drive | | OFF | OFF | Drive | OFF | OFF | OFF | ON |
| Brake | Regenerative braking | Normal | OFF | OFF | Generate electricity | ON | OFF | OFF | OFF |
| | | High output (2 motors) | OFF | Generate electricity | Generate electricity | ON | OFF | OFF | OFF |

HYBRID POWERTRAIN FOR VEHICLE

CROSS REFERENCE TO RELATED APPLICATION

The present application claims priority to and the benefit of Korean Patent Application No. 10-2016-0162537, filed on Dec. 1, 2016, the entire contents of which is incorporated herein by reference.

BACKGROUND

The statements in this section merely provide background information related to the present disclosure and may not constitute prior art.

The present disclosure relates generally to a hybrid powertrain for a vehicle. More particularly, the present disclosure relates to components of a hybrid powertrain that is capable of implementing an electrically variable transmission (EVT) mode.

A powertrain of a hybrid vehicle may include a motor and an internal combustion engine, and is desired to provide a driving mode for various vehicle driving conditions in order to enhance fuel efficiency of a vehicle and to satisfy driving quality of a vehicle.

SUMMARY

The present disclosure addresses the above problems occurring in the related art, and the present disclosure provides a hybrid powertrain for a vehicle, enhancing running performance of an electric vehicle mode, enhancing fuel efficiency by reducing energy consumption, saving space in a vehicle by utilizing relatively simple and compact components, and reducing material costs.

In one form of the present disclosure, there is provided a hybrid powertrain for a vehicle, the powertrain including: a planetary gear system including coaxial double pinions each having a first pinion and a second pinion that have different diameters and are provided to rotate coaxially, a carrier carrying the coaxial double pinions, and four rotation elements each configured to input or output power; and an engine, a first motor generator, a second motor generator, and an output shaft that are respectively connected to the four rotation elements of the planetary gear system.

The four rotation elements of the planetary gear system may include: a sun gear configured to mesh with inner sides of the second pinions of the coaxial double pinions; a first ring gear configured to mesh with outer sides of the second pinions; a second ring gear configured to mesh with outer sides of the first pinions of the coaxial double pinions; and the carrier.

The second pinion may have a diameter greater than a diameter of the first pinion.

The second ring gear may be directly connected to the engine; the first ring gear may be directly connected to the first motor generator; the sun gear may be directly connected to the second motor generator; and the carrier may be connected to the output shaft.

The first ring gear may be connected to a transmission casing via a second brake such that the first ring gear is fixed to the transmission casing; and the second ring gear may be connected to the transmission casing via a first brake such that the second ring gear is fixed to the transmission casing.

The hybrid powertrain may include a one-way clutch provided between the second ring gear and the transmission casing to prevent the second ring gear from rotating in a reverse direction.

The hybrid powertrain may include a clutch provided between the sun gear and the carrier to connect or disconnect the sun gear and the carrier.

The first motor generator and the second motor generator may be provided to be coaxial with a rotation axis of the planetary gear system; the carrier may include an output drive gear coaxially provided between the first motor generator and the second motor generator to rotate relative to the first and second motor generators; the output shaft may include an output driven gear meshed with the output drive gear.

The clutch may be provided to connect or disconnect the output drive gear and a sun gear shaft connecting the sun gear and the second motor generator.

According to the hybrid powertrain for the vehicle, it is possible to properly drive the engine, to enhance running performance of an electric vehicle mode, to enhance fuel efficiency by reducing energy consumption, to save space in the vehicle by utilizing relatively simple and compact components, and to reduce material costs.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 4 is a table showing operation modes of the powertrain of FIG. 1;

Figure 1:
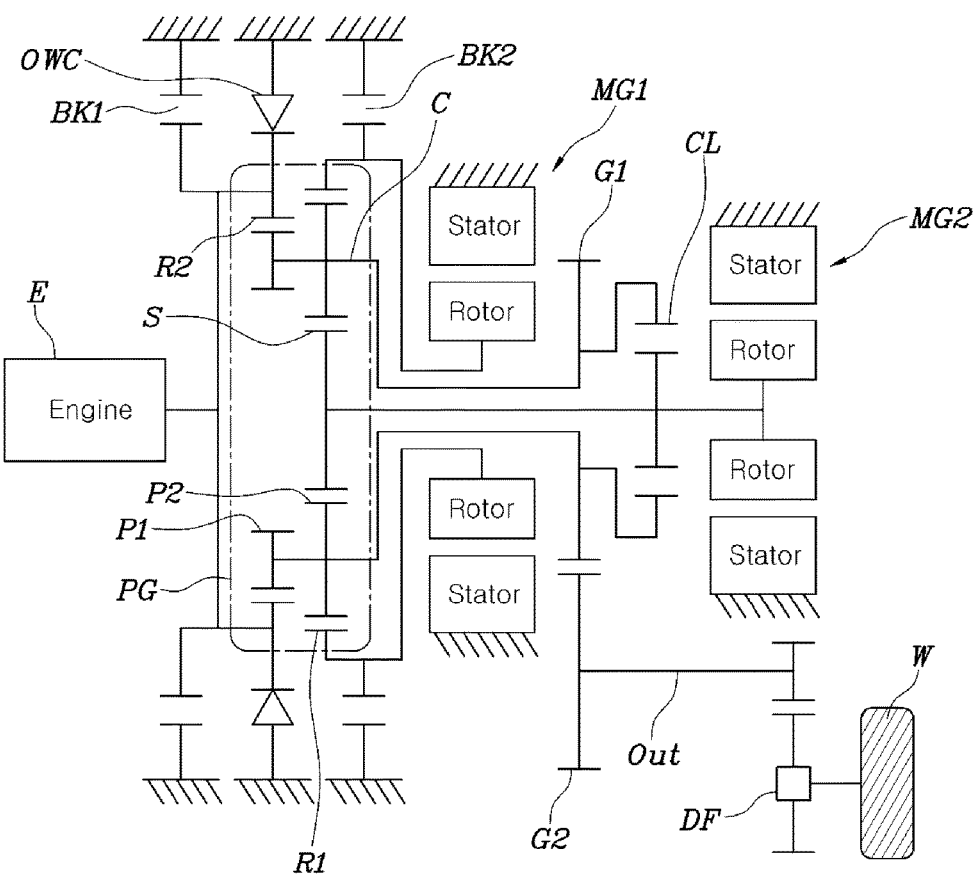
FIG. 1 is a view showing configurations of a hybrid powertrain for a vehicle according to the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 2:
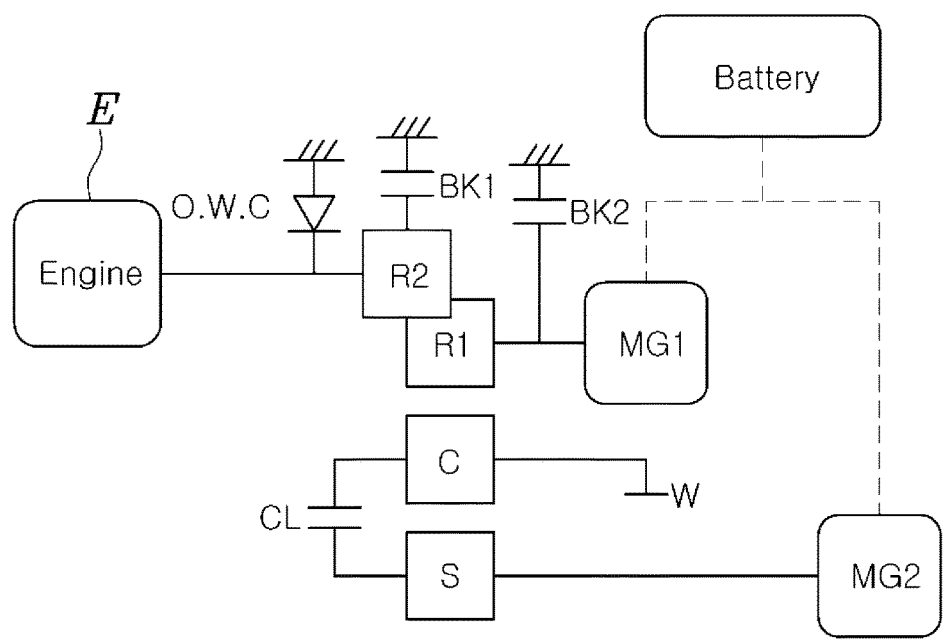
FIG. 2 is a schematic diagram showing the powertrain of FIG. 1.
Figure 3:
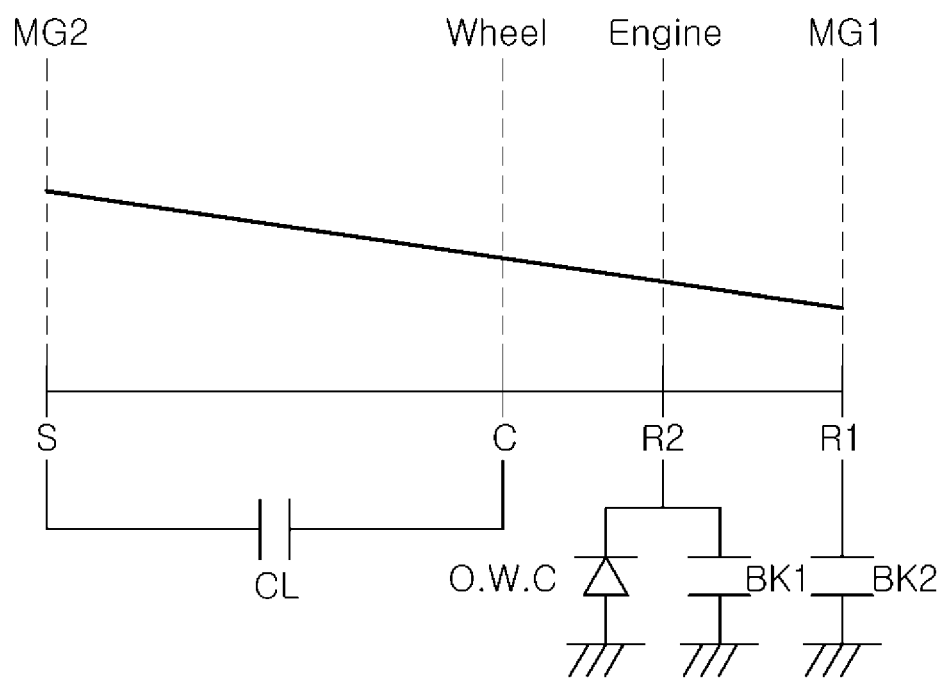
FIG. 3 is a lever diagram showing the powertrain of FIG. 1.
Figure 5:
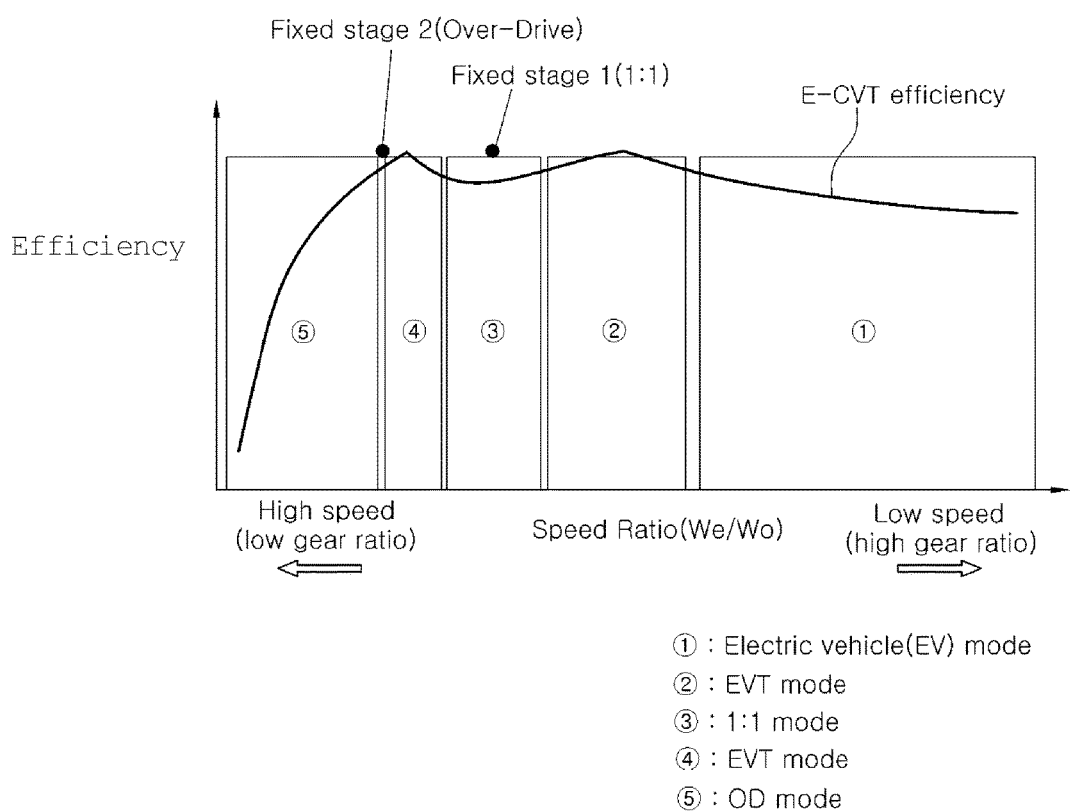
FIG. 5 is a graph showing applied modes and efficiency thereof depending on gear ratios of the powertrain of FIG. 1.

Referring to FIGS. 1 to 3, according to one form of the present disclosure, a hybrid powertrain includes: a planetary gear system "PG" including coaxial double pinions each having a first pinion "P1" and a second pinion "P2" that have different diameters and are provided to rotate coaxially, a carrier "C" carrying the coaxial double pinions, and four rotation elements where power is input and output; and an engine "E", a first motor generator "MG1", a second motor generator "MG2", and an output shaft "OU" that are respectively connected to the four rotation elements of the planetary gear system PG.

According to one form of the present disclosure, the four rotation elements of the planetary gear system PG include: a sun gear "S" provided to mesh with inner sides of the second pinions P2 of the coaxial double pinions; a first ring gear "R1" provided to mesh with outer sides of the second pinions P2; a second ring gear "R2" provided to mesh with outer sides of the first pinions P1 of the coaxial double pinions; and the carrier C. The second pinion P2 has a diameter greater than a diameter of the first pinion P1.

The second ring gear R2 is directly connected with the engine E, the first ring gear R1 is directly connected with the first motor generator MG1, the sun gear S is directly connected with the second motor generator MG2, and the carrier C is connected with the output shaft OUT.

The first ring gear R1 is connected to a transmission casing "CS" via a second brake "BK2" such that the first ring gear is fixed to the transmission casing. The second ring gear R2 is connected to the transmission casing CS via a first brake "BK1" such that the second ring gear is fixed to the transmission casing.

According to one form of the present disclosure, a one-way clutch "OWC" is provided between the second ring gear R2 and the transmission casing C to inhibit or prevent the second ring gear R2 from rotating in a reverse direction, but the one-way clutch OWC may be omitted.

A clutch "CL" is provided between the sun gear S and the carrier C to connect or disconnect the sun gear and the carrier.

As shown in FIG. 1, the first motor generator MG1 and the second motor generator MG2 are provided to be coaxial with a rotation axis of the planetary gear system PG. The carrier C includes an output drive gear G1 coaxially provided between the first motor generator MG1 and the second motor generator MG2 to rotate relative to the first and second motor generators. The output shaft OUT includes an output driven gear G2 meshed with the output drive gear G1.

The output shaft OUT may be connected with a differential gear "DF", etc. to provide power to a driving wheel W.

According to one form of the present disclosure, the clutch CL is provided to connect or disconnect the output drive gear G1 and a sun gear shaft connecting the sun gear S and the second motor generator MG2. A space is provided to easily supply an operation control signal to the clutch CL. The space separates the first motor generator MG1 and the second motor generator MG2 to secure smooth cooling performance.

Operation modes of the above-described hybrid powertrain according to the present disclosure will be disclosed.

Figure 6:
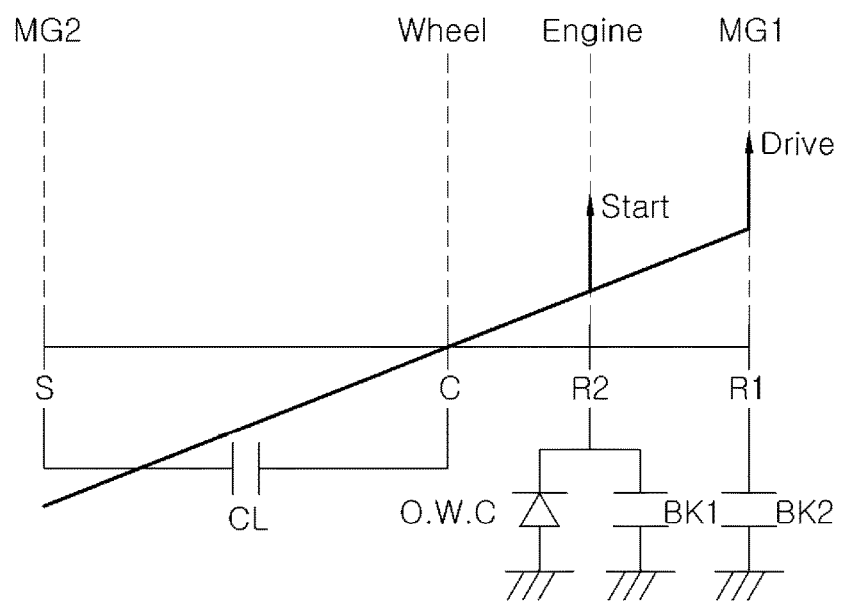
FIGS. 6 to 22 are lever diagrams showing operation for each mode of the powertrain of FIG. 1.

FIG. 6 is a view showing an MG1 start mode. In the MG1 start mode, power for starting the engine E is provided by driving the first motor generator MG1, and the output shaft OUT is stopped. While the carrier C is stopped, power of the first motor generator MG1 is supplied to the engine E by reducing the speed of the power supplied to the first ring gear R1, whereby the engine E is started.

Figure 7:
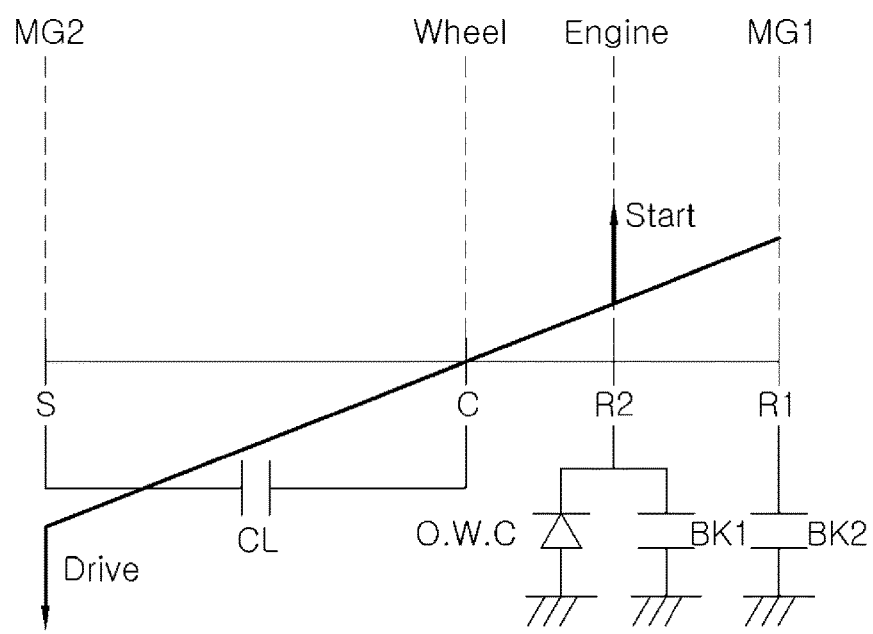

FIG. 7 is a view showing an MG2 start mode. As shown in FIG. 7, the carrier C is fixed in the MG2 start mode. Therefore, by reversely rotating the second motor generator MG2, torque in a forward direction for starting the engine E is provided to the second ring gear R2.

Figure 8:
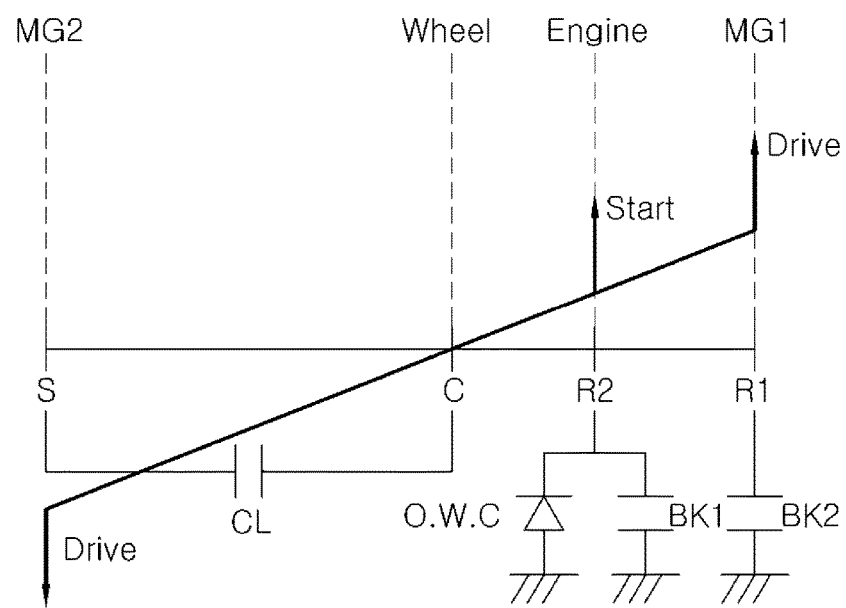

FIG. 8 is a view showing a cold-start mode. In the cold-start mode, while drag torque of the engine E is exceedingly high, higher torque is supplied to the engine E. The first motor generator MG1 rotates in a forward direction and the second motor generator MG2 rotates in a reverse direction, whereby the engine E is smoothly started.

Figure 9:
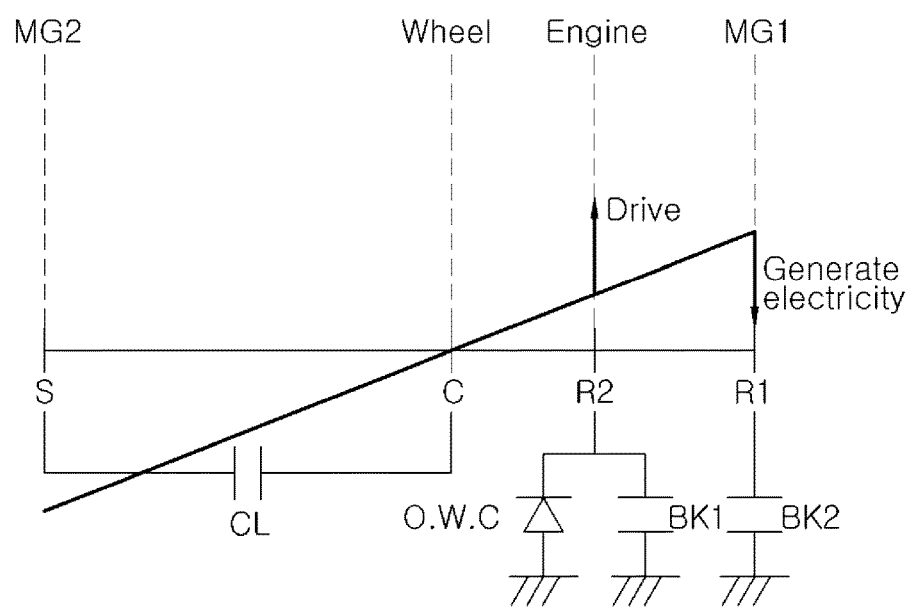

FIG. 9 is a view showing an MG1 generation mode in which a vehicle is stopped. In the MG1 generation mode, while the carrier C is fixed, the engine E supplies power to the first motor generator MG1 through the first ring gear R1 by increasing the speed of the power. Consequently, the first motor generator MG1 generates electricity to charge a battery.

Figure 10:
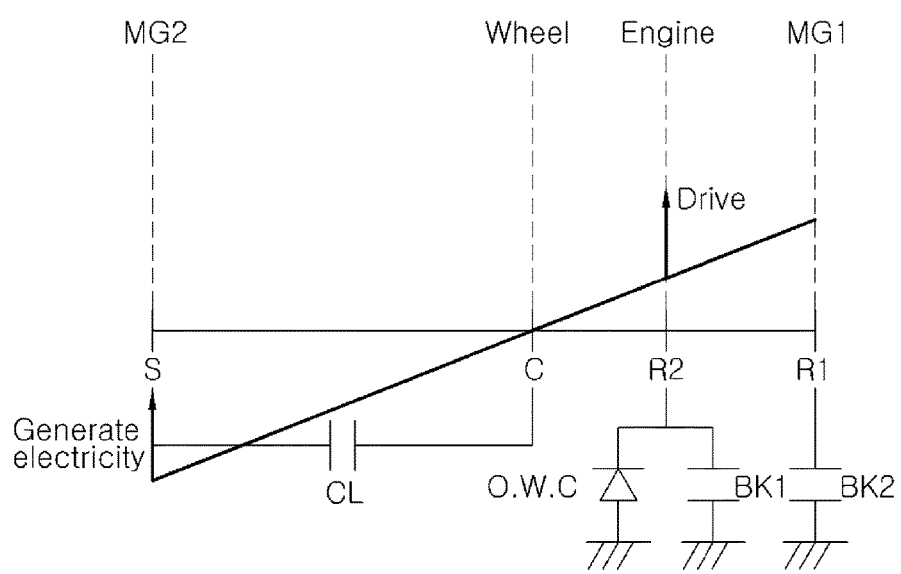

FIG. 10 is a view showing an MG2 generation mode. In the MG generation mode, the carrier C is stopped, the sun gear S rotates in a reverse direction by power of the engine E, and the second motor generator MG2 generates electricity by using the power.

Figure 11:
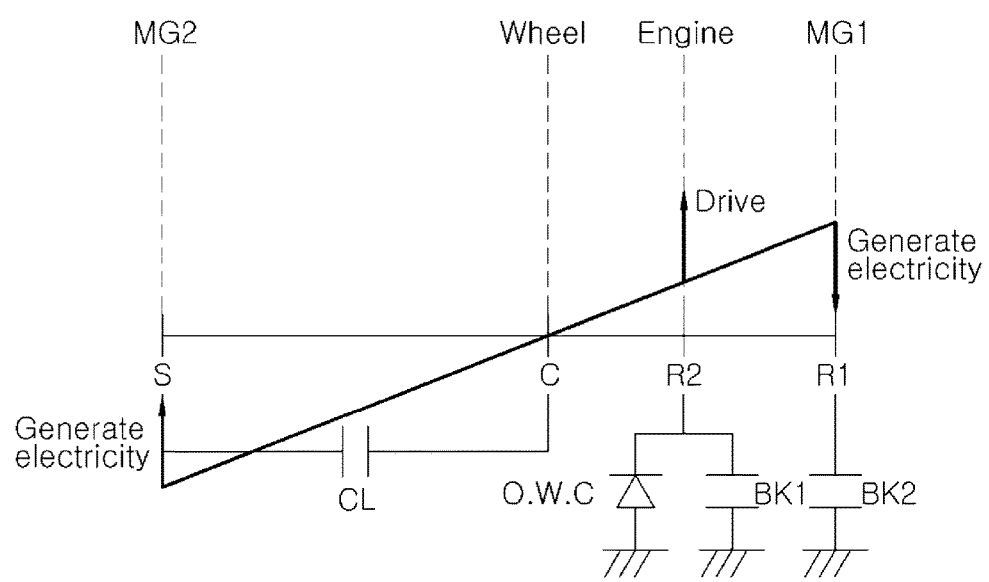

FIG. 11 is a view showing a rapid-charging mode in which modes of FIGS. 9 and 10 are simultaneously operated. In the rapid-charging mode, for example, when state of charge (SOC) of a battery is extremely low, both the first motor generator MG1 and the second motor generator MG2 generate electricity by using power of the engine E to rapidly charge the battery.

Figure 12:
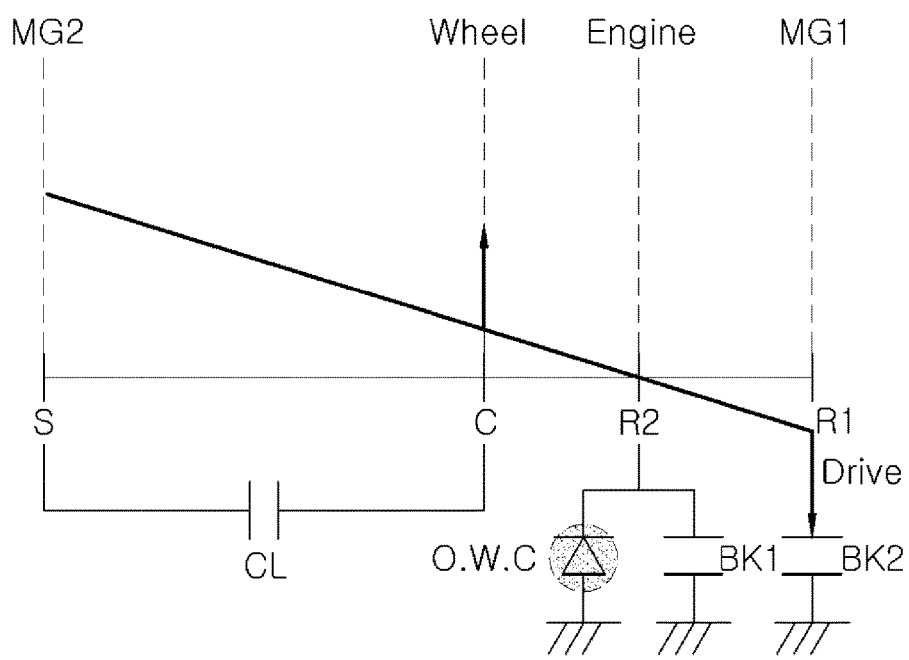

FIG. 12 is a view showing an MG1 drive mode of an EV mode, which is an electric vehicle mode. In the MG1 drive mode, the first motor generator MG1 rotates in a reverse direction, and the engine E is maintained in a stop state, whereby the EV mode is implemented by outputting power to the output shaft OUT in a forward direction.

Here, the stop state of the engine E may be secured without the one-way clutch OWC when reverse rotation resistance of the engine E is exceedingly large. However, the one-way clutch OWC is provided to secure a driving state, and thus the EV mode may be implemented reliably without the reverse rotation of the engine E.

In order to inhibit or prevent the engine E from rotating in a reverse direction, the first brake BK1 may be used. However, in this case, fluid pressure is desired to operate the first brake BK1, and thus energy for the fluid pressure is wasted. Therefore, such a waste of energy is avoided by using the one-way clutch OWC, thereby enhancing fuel efficiency of a vehicle.

Figure 13:
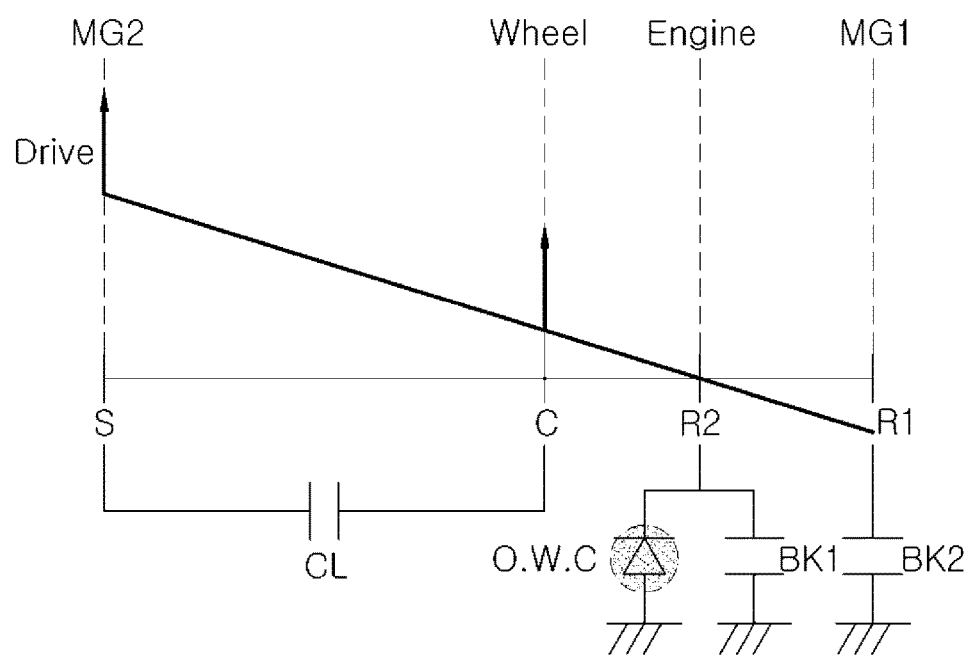

FIG. 13 is a view showing an MG2 drive mode of the EV mode. In the MG2 drive mode, output torque in a forward direction is supplied to the output shaft OUT by driving the second motor generator MG2 in a forward direction. The second ring gear R2 that is connected with the engine E is uniformly fixed by the one-way clutch OWC.

Figure 14:
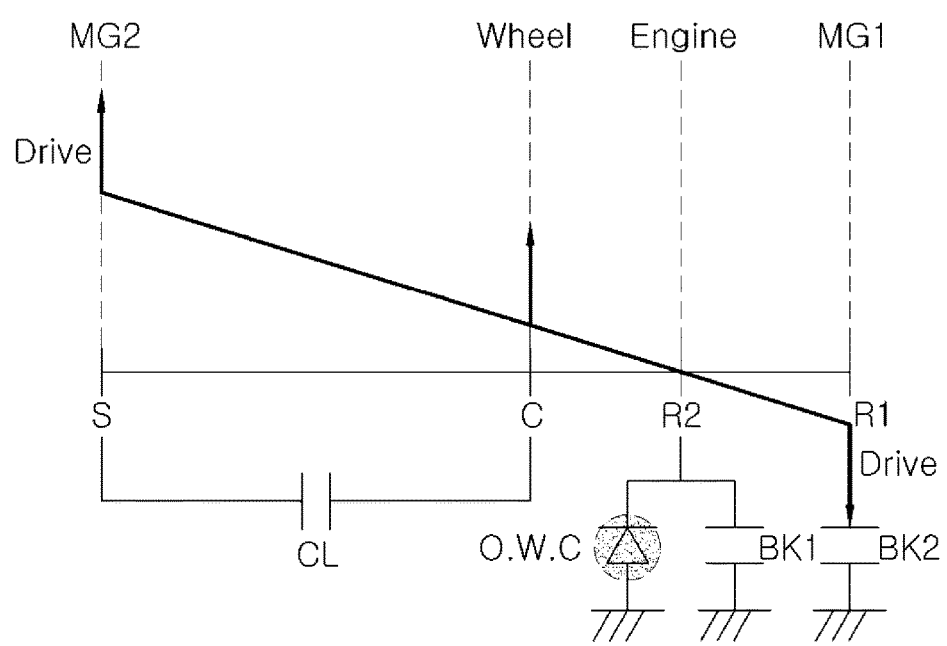

FIG. 14 is a view showing a high output mode of the EV mode. In the high output mode, the modes of FIGS. 12 and 13 are simultaneously operated. In addition, the first generator MG1 rotates in a reverse direction, the second motor generator MG2 rotates in a forward direction, output torque in a forward direction is supplied to the carrier C, and the one-way clutch OWC prevents the engine E from rotating in a reverse direction. Consequently, an EV mode with high output is performed by using power of both the first motor generator MG1 and the second motor generator MG2.

Figure 15:
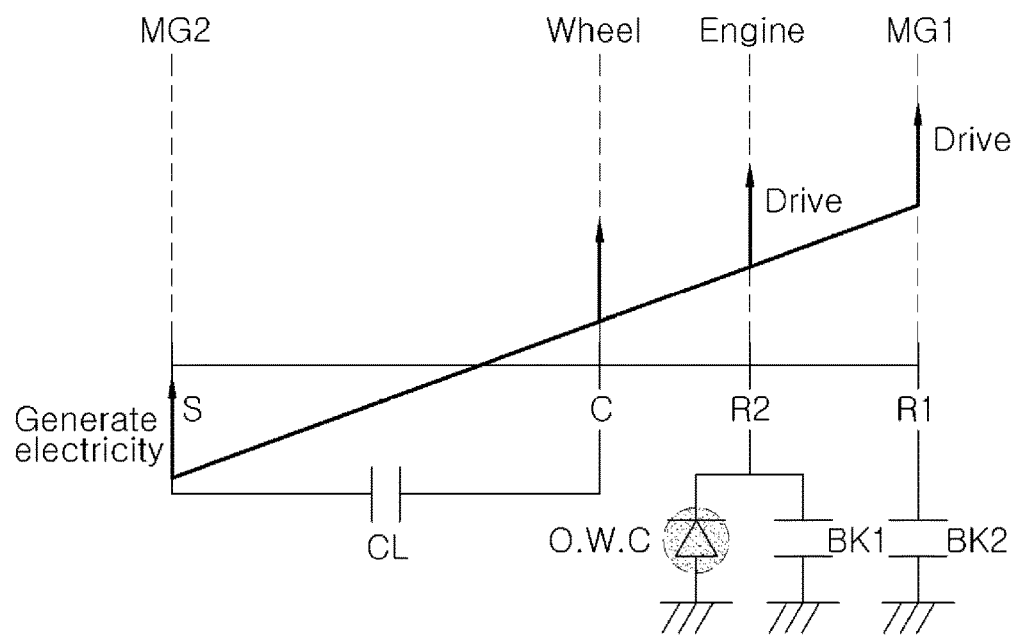
Figure 16:
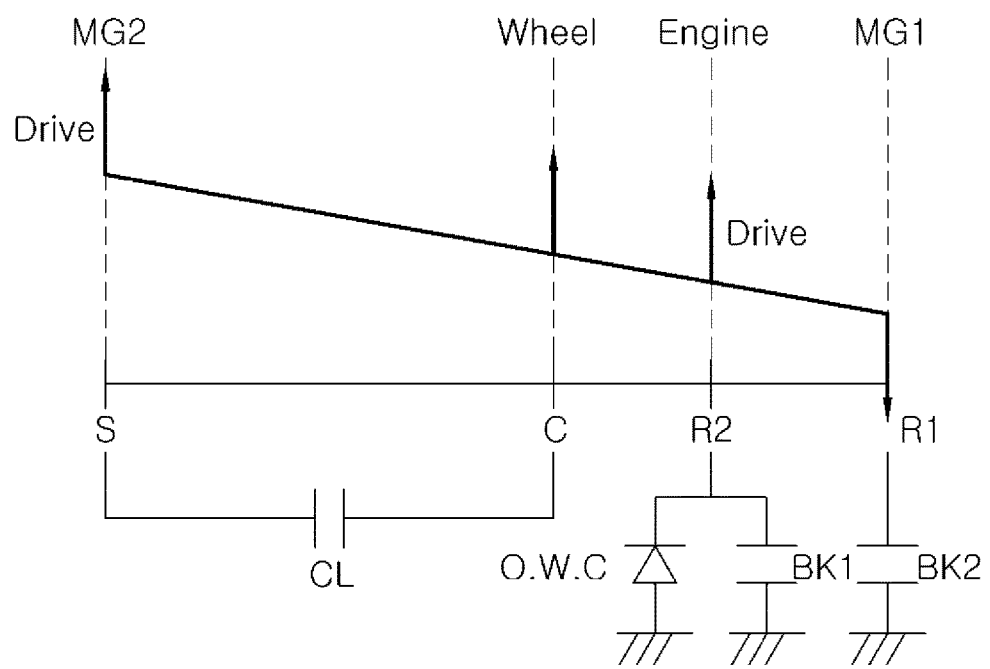

FIGS. 15 and 16 are views showing an EVT mode, which is one of hybrid electric vehicle ("HEV") driving modes. FIG. 15 is a view showing a mode for a low speed period, and FIG. 16 is a view showing a mode for intermediate and high speed periods.

In both FIGS. 15 and 16, the engine E is in a drive state, and the first motor generator MG1 and the second motor generator MG2 continuously vary between a drive state and a generation state, whereby a function of an electronically controlled continuously variable transmission is implemented as having that a gear ratio of the output shaft OUT is continuously changed relative to power of the engine E.

Such a gear ratio is continuously adjusted to be in the desired state depending on driving conditions of a vehicle.

Figure 17:
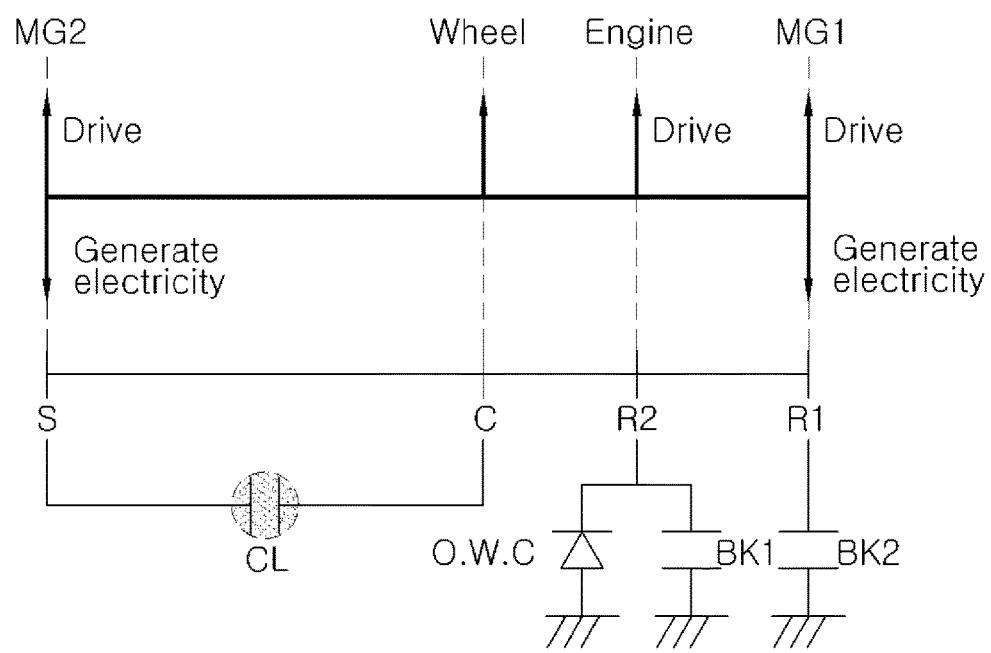

FIG. 17 is a view showing a fixed stage 1 mode of the HEV mode, the fixed stage 1 mode implementing a gear ratio of 1:1.

In detail, the planetary gear system PG rotates integrally by coupling the clutch CL, whereby power of the engine E is output to the carrier C in a gear ratio of 1:1 and is supplied to the output shaft OUT.

Figure 18:
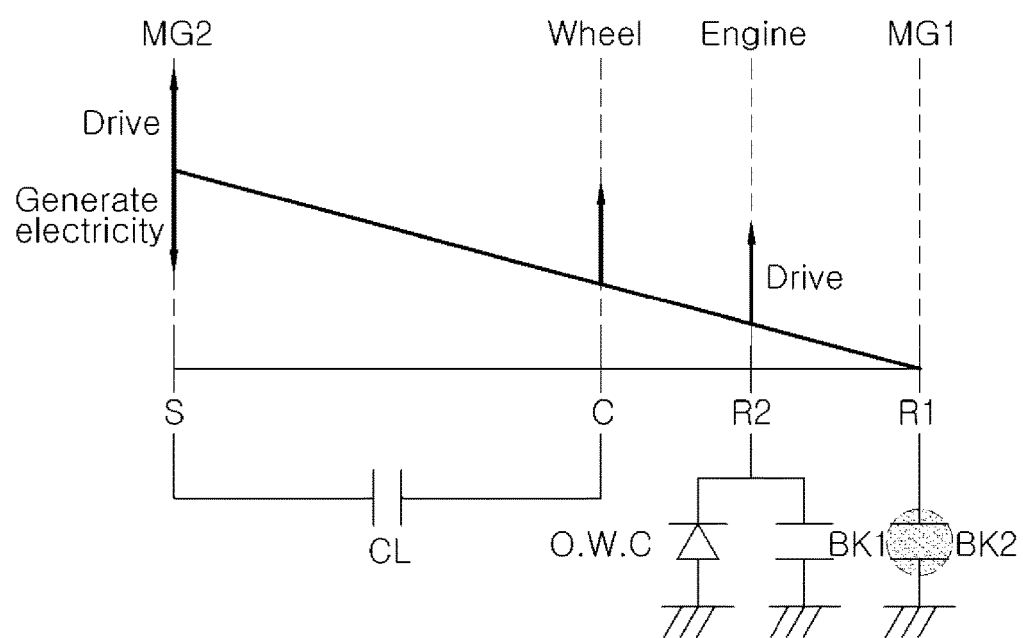

FIG. 18 is a view showing a fixed stage 2 mode of the HEV mode, the fixed stage 2 mode implementing an overdrive gear ratio.

More specifically, speed of the carrier C increases faster than speed of the engine E by coupling the second brake BK2. Here, the second motor generator MG2 may assist driving power of the engine E, or may generate electricity by using the driving power.

Figure 19:
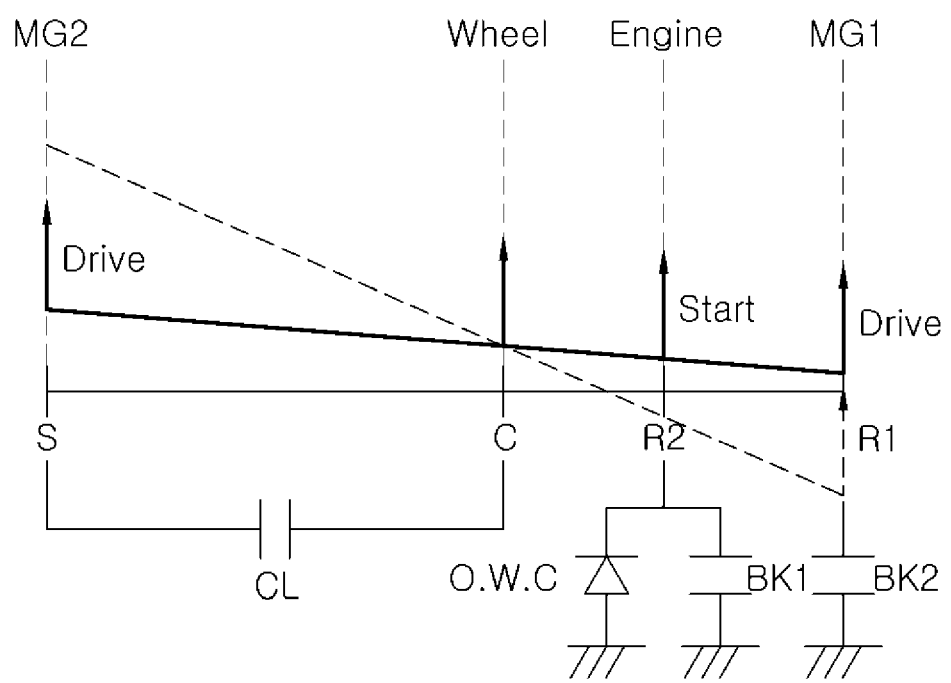

FIG. 19 is a view showing a mode conversion state that is conversion from an EV mode to an HEV mode.

That is, in the EV mode, the first motor generator MG1 is driven until its speed reaches at the speed to start the engine E, whereby the engine E is started and the HEV mode is operated.

Figure 20:
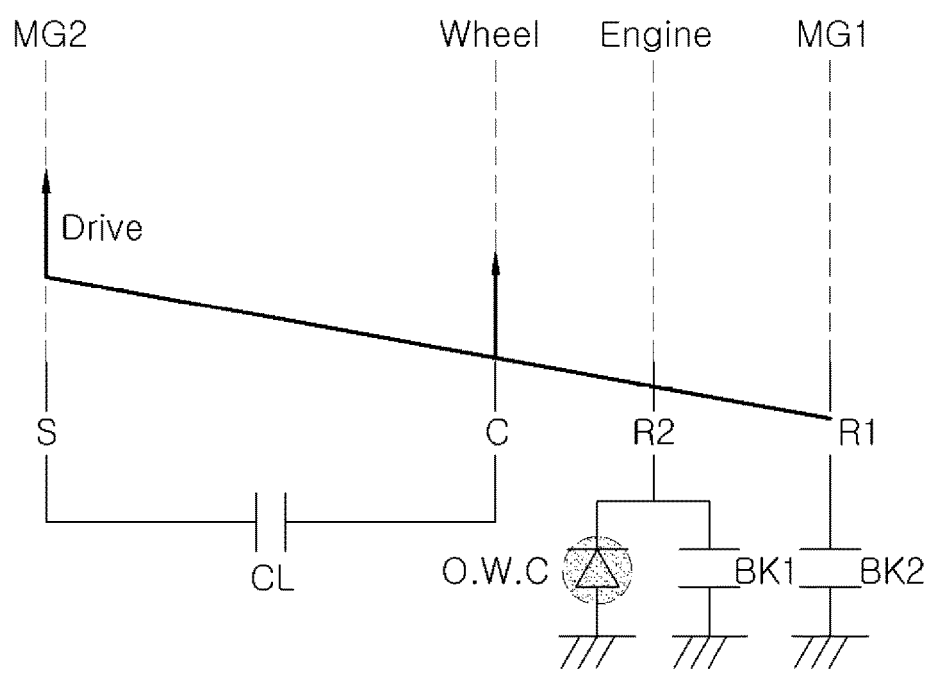

FIG. 20 is a view showing a creep-driving mode. While the engine E is stopped, reduced output torque is supplied to the carrier C by driving the second motor generator MG2, thereby operating the creep-driving mode. Here, the one-way clutch OWC prevents the engine E from rotating in a reverse direction without using separate control power.

Figure 21:
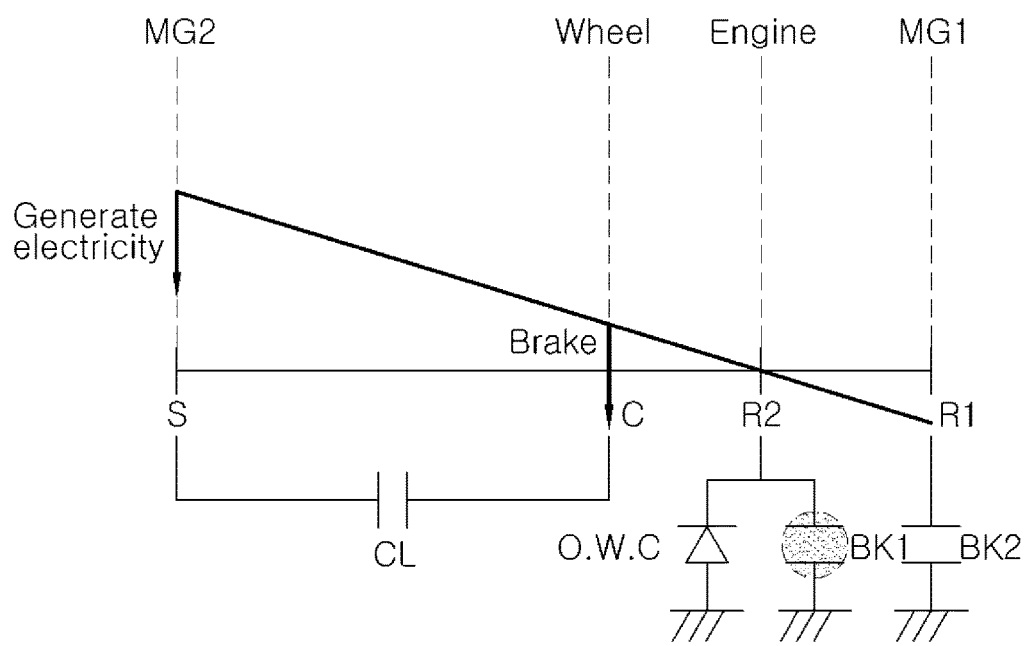

FIG. 21 is a view showing a normal mode of a regenerative braking mode. In the normal mode, the engine E is maintained in the stop state by coupling the first brake BK1, and the second motor generator MG2 generates electricity by using power that is input to the carrier C from the output shaft OUT.

Figure 22:
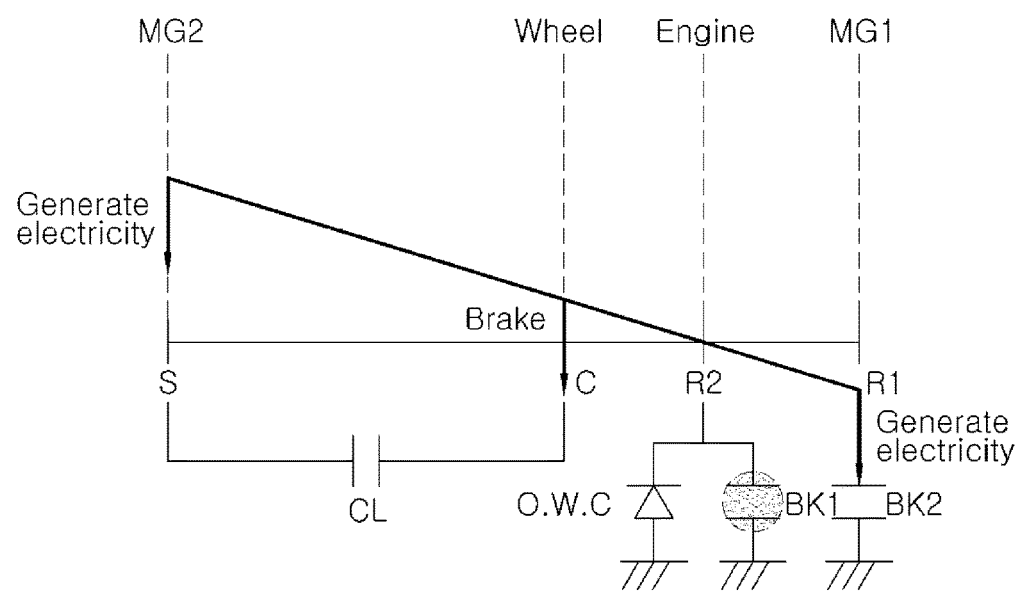

FIG. 22 is a view showing a high output mode of the regenerative braking mode. In the high output mode, both the first motor generator MG1 and the second motor generator MG2 generate electricity in the same condition of FIG. 21 to provide large braking power and large electricity power output.

Although exemplary forms of the present disclosure has been described for illustrative purposes, those skilled in the art will appreciate that various modifications, additions and substitutions are possible, without departing from the scope and spirit of the present disclosure.

What is claimed is:

1. A hybrid powertrain for a vehicle, the powertrain comprising:
   a planetary gear system including coaxial double pinions each having a first pinion and a second pinion that have different diameters and are provided to rotate coaxially, a carrier configured to carry the coaxial double pinions, and four rotation elements each configured to input or output power; and
   an engine, a first motor generator, a second motor generator, and an output shaft that are respectively connected to the four rotation elements of the planetary gear system,
   wherein the four rotation elements of the planetary gear system comprise:
     a sun gear configured to mesh with inner sides of the second pinions of the coaxial double pinions;
     a first ring gear configured to mesh with outer sides of the second pinions;
     a second ring gear configured to mesh with outer sides of the first pinions of the coaxial double pinions; and
     the carrier configured to carry the coaxial double pinions, and
   wherein the second ring gear is directly connected to the engine, the first ring gear is directly connected to the first motor generator, the sun gear is directly connected to the second motor generator, and the carrier is connected to the output shaft.

2. The hybrid powertrain of claim 1, wherein the second pinion has a diameter greater than a diameter of the first pinion.

3. The hybrid powertrain of claim 1, wherein the first ring gear is connected to a transmission casing via a second brake such that the first ring gear is fixed to the transmission casing; and
   the second ring gear is connected to the transmission casing via a first brake such that the second ring gear is fixed to the transmission casing.

4. The hybrid powertrain of claim 3, further comprising:
   a one-way clutch provided between the second ring gear and the transmission casing to prevent the second ring gear from rotating in a reverse direction.

5. The hybrid powertrain of claim 3, further comprising:
   a clutch provided between the sun gear and the carrier to connect or disconnect the sun gear and the carrier.

6. The hybrid powertrain of claim 5, wherein the first motor generator and the second motor generator are provided to be coaxial with a rotation axis of the planetary gear system,
   the carrier includes an output drive gear coaxially provided between the first motor generator and the second motor generator to rotate relative to the first and second motor generators;
   the output shaft includes an output driven gear meshed with the output drive gear.

7. The hybrid powertrain of claim 6, wherein the clutch is provided to connect or disconnect the output drive gear and a sun gear shaft connecting the sun gear and the second motor generator.

* * * * *